United States Patent [19]
Wilson

[11] Patent Number: 5,905,366
[45] Date of Patent: *May 18, 1999

[54] METHOD AND APPARATUS FOR POWERING AN ELECTRICAL CIRCUIT USING AN ISOLATED WINDING

[75] Inventor: Malcolm Philip Wilson, Crewkerne, United Kingdom

[73] Assignee: Switched Reluctance Drives Limited, Harrogate, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/756,306

[22] Filed: Nov. 25, 1996

[30] Foreign Application Priority Data

Nov. 23, 1995 [GB] United Kingdom ............... 9524022

[51] Int. Cl.$^6$ .................................................. H02P 9/00
[52] U.S. Cl. ......................... 322/44; 318/701; 310/90.5
[58] Field of Search ................ 322/44, 50; 318/701; 310/90.5

[56] References Cited

U.S. PATENT DOCUMENTS

| | | | |
|---|---|---|---|
| 4,404,503 | 9/1983 | Ward et al. | 318/119 |
| 4,761,590 | 8/1988 | Kaszman | 318/254 |
| 5,053,662 | 10/1991 | Ritcher | 310/90.5 |
| 5,493,195 | 2/1996 | Heglund et al. | 318/701 |
| 5,522,434 | 6/1996 | Lindblom | 139/1 E |
| 5,606,247 | 2/1997 | Sutrina | 322/50 |
| 5,627,445 | 5/1997 | Webster | 318/701 |

FOREIGN PATENT DOCUMENTS

| | | |
|---|---|---|
| 0 254 129 A1 | 1/1988 | European Pat. Off. . |
| 0 524 384 A1 | 1/1993 | European Pat. Off. . |
| 3835176 A1 | 4/1990 | Germany . |

OTHER PUBLICATIONS

Patent Abstracts of Japan, vol. 6, No. 173 (E–129) [1051], 7, Sep. 7, 1982.

Stephenson, J.M. et al. "The Characteristics, Design and Applications of Switched Reluctance Motors and Drives", PCIM '93, Jun. 21–24, 1993.

*Primary Examiner*—Nestor Ramirez
*Assistant Examiner*—Nicholas Ponomarenko
*Attorney, Agent, or Firm*—Patterson & Keough, P.A.

[57] ABSTRACT

An electrical machine system includes at least one electrical machine, such as a switched reluctance machine, that produces a magnetic field. According to one embodiment, the machine is a rotary machine with a rotor, a stator, and a sensor for indicating their relative movement. The sensor of the controller is powered by a power supply unit, the power output of the power supply unit being derived from the magnetic field of the machine. The power supply preferably is isolated electrically from the current running in the machine, and from the power supply for the machine, reducing the risk of voltage transience, noise, and other undesirable interference. A corresponding method provides similar advantages.

18 Claims, 2 Drawing Sheets

METHOD AND APPARATUS FOR POWERING AN ELECTRICAL CIRCUIT USING AN ISOLATED WINDING

CROSS-REFERENCE TO RELATED APPLICATION

The subject matter of this application is related to the subject matter of UK Patent Application No. GB 9524022.2, from which priority is claimed under 35 U.S.C. § 119 and which is incorporated herein by reference.

BACKGROUND OF THE INVENTION

1. Field of the Invention

This invention relates to a method of powering an electrical circuit. The invention particularly, but not exclusively, relates to a method of operating a circuit including sensing means for sensing the position of a rotor relative to a stator of an electric machine of the kind in which data concerning the position of the rotor relative to the stator is utilized by a motor controller to energize appropriately windings associated with the stator. The invention also relates to associated apparatus.

2. Description of Related Art

Particularly in switched reluctance and brushless types of machine, it is a requirement for the position of the rotor relative to the stator to be known so that the various windings of the stator can be energized at appropriate times, i.e. when respective poles of the stator and rotor are appropriately positioned.

A more detailed description of the switched reluctance machine can be found in the article "The Characteristics, Design and Applications of Switched Reluctance Motors and Drives" by Stephenson et al., PCIM '93, Jun. 21–24, 1993. It will be appreciated that the switched reluctance machine, for example, can be run equally well as a motor or a generator.

Conventionally, the rotor carries a timing disc. A sensor is able to sense the rotational position of the disc and provide an input to an electronic circuit which generates data for transmission to the motor controller where the data is processed. The motor controller energizes a respective winding of the stator in accordance with the position of the stator. The electronic circuit is conventionally powered from a power supply in the motor controller.

In some applications, e.g. where the motor is a compressor motor in an air ventilator and/or air conditioning/circulating system of a vehicle, such as a carriage of a train, it is a requirement for the motor controller to be positioned remote from the motor. Thus, long lengths of cabling are required from the controller to the motor, including cab ling necessary to provide a power supply to the electronic circuit of the sensing means. This introduces the risk of voltage transients and noise being induced in the power supply to the electronic circuit, particularly where the motor controller is located in a hostile electromagnetic environment, where transients may need to be suppressed at either or both ends of the power supply cabling. Both the cabling for the power supply to the electronic circuit and the apparatus required to achieve transient suppression impose a cost penalty.

SUMMARY OF THE INVENTION

According to a first embodiment of the invention there is provided a method of operating an electrical circuit requiring an electrical power supply, the method comprising deriving the power supply from a machine having an accessible magnetic field.

Particularly in the case of the electrical circuit being a part of a sensing means to sense the position of a rotor relative to a stator of an electrical machine, the requirements for cabling to supply power to the electrical circuit where no appropriate local power supply is available, and for the suppression of transients in that power supply, are avoided.

Furthermore, the sensing means and, in particular, the electrical circuit, can be completely electrically isolated from the machine.

The magnetic field may be arranged to excite a coil, thus causing a voltage to be produced in the coil to power the sensing means.

Embodiments of the invention may particularly be applied to an electrical circuit being part of a sensing means for sensing the position of a rotor of an electrical machine whether run as a motor or a generator.

According to a second aspect of the invention we provide a method of controlling a motor of the kind in which data concerning the position of a rotor relative to a stator is utilized by a controller to power appropriately windings of the stator, the method comprising sensing the position of the rotor by sensing means which are powered by an electrical power supply derived from a magnetic field associated with the machine and providing data concerning the position of the rotor relative to the stator to the controller.

The data may be transmitted from the sensing means to the motor controller along a fiber optic link or other non-electrically conductive means of data transmission between the controller and the sensing means.

The magnetic field may excite a coil to cause a voltage to be produced in the coil to power the sensing means, the coil being positioned adjacent, but being electrically independent of, a winding of the motor of the machine such that the magnetic field is generated by the motor. Alternatively, the coil may be positioned around at least one conductor providing power to a winding of the machine such that the magnetic field is generated by the electrical current flowing in the conductor.

However, any other magnetic field generated by the machine or otherwise associated with the machine may be used.

The electrical signal generated in the coil may be rectified, filtered and/or regulated as required to provide an appropriate power supply to the sensing means, preferably by means located at or adjacent the machine so that no or relatively little cabling is required between the coil and the sensing means.

According to a third aspect of the invention we provide an electrical motor apparatus, including means to derive from a magnetic field associated with the apparatus, an electrical power supply, and the apparatus further comprising an electrical circuit powered by the derived electrical power supply.

Again, the electrical circuit may be part of sensing means which, in use, senses the position of a rotor relative to a stator and provides data to a controller which uses the data to control the power supplied to windings of the stator.

The sensing means may further comprise a sensor located on or adjacent a driven shaft of the motor, the sensor being sensitive to the position of the shaft, and hence of the rotor, relative to the stator.

Embodiments of the invention have particular merit where the motor controller is remote from the stator and rotor, and the sensing means are adapted to provide the data to the motor controller. Preferably, the electrical circuit powered by the derived electrical power supply is located closer to the stator and rotor than to the controller.

BRIEF DESCRIPTION OF THE DRAWINGS

Embodiments of the invention can be put into practice in various ways, some of which will now be described by way of example with reference to the accompanying drawing in which.

DETAILED DESCRIPTION OF PREFERRED EMBODIMENTS

Figure 1:
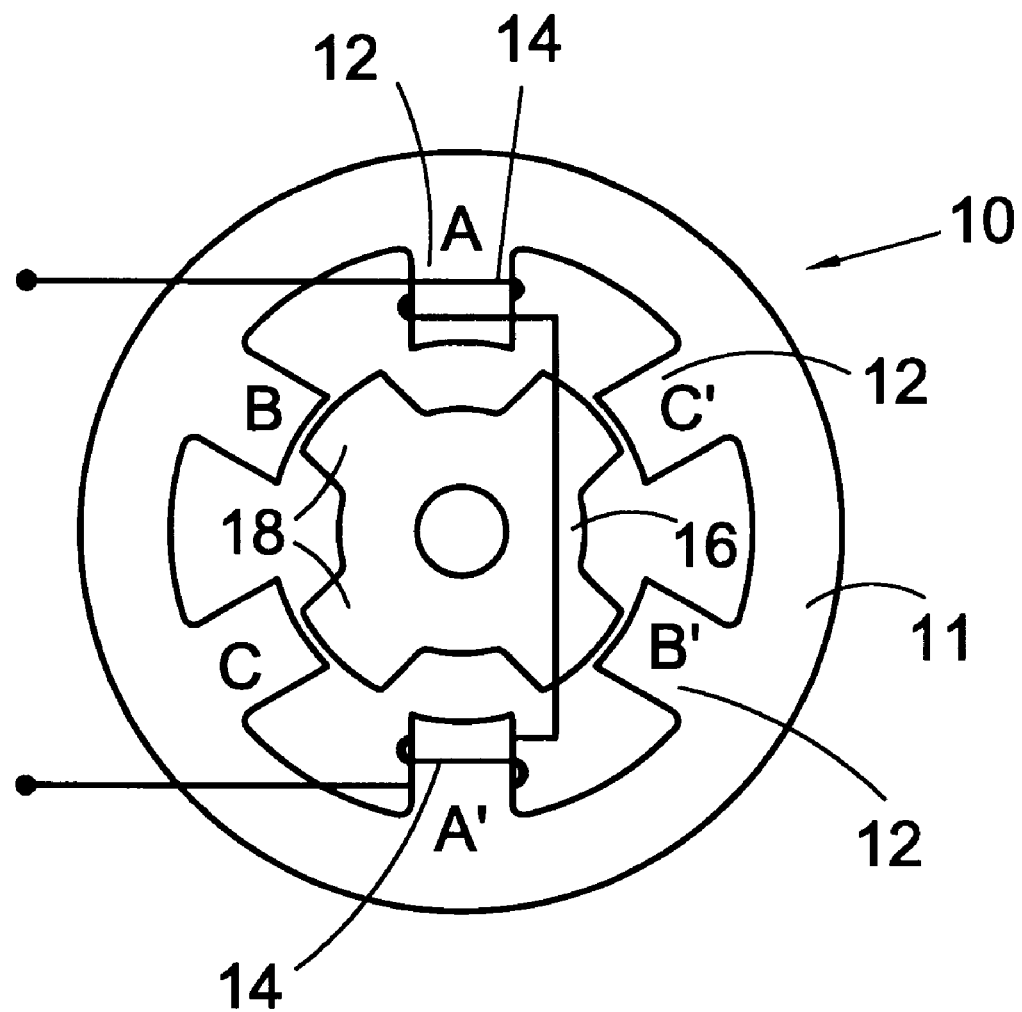
FIG. 1 is a cross-section of a conventional reluctance machine.

Referring to the drawings, a switched reluctance machine 10 is arranged as part of a switched reluctance drive system which may be arranged to run the machine 10 as a motor or a generator as the skilled person will appreciate. As shown in FIG. 1, the machine 10 comprises a laminated stator 11 which defines, in this example, six stator poles 12. A winding 14 is arranged in relation to each stator pole 12 to energize it. It will be seen that the pairs of diametrically opposed windings 14 are electrically connected together to form three phases of windings. For the sake of clarity, only the windings of one phase (phase A) are shown. The windings for each of the remaining two phases B and C are arranged in relation to the respective pairs of diametrically opposed stator poles 12.

A rotor 16 is arranged to rotate within the stator 11. The rotor 16 defines four rotor poles 18. The phases of the windings 14 are energized in sequence to create a rotationally shifting magnetic field which induces the rotor 16 to move as it seeks the orientation of least reluctance to the induced flux passing between the opposed windings 14 of a phase through the diametrically opposite poles 18 of the rotor 16. Other numbers of phases and combinations or rotor and stator pole numbers will be apparent to the skilled person.

Figure 2:
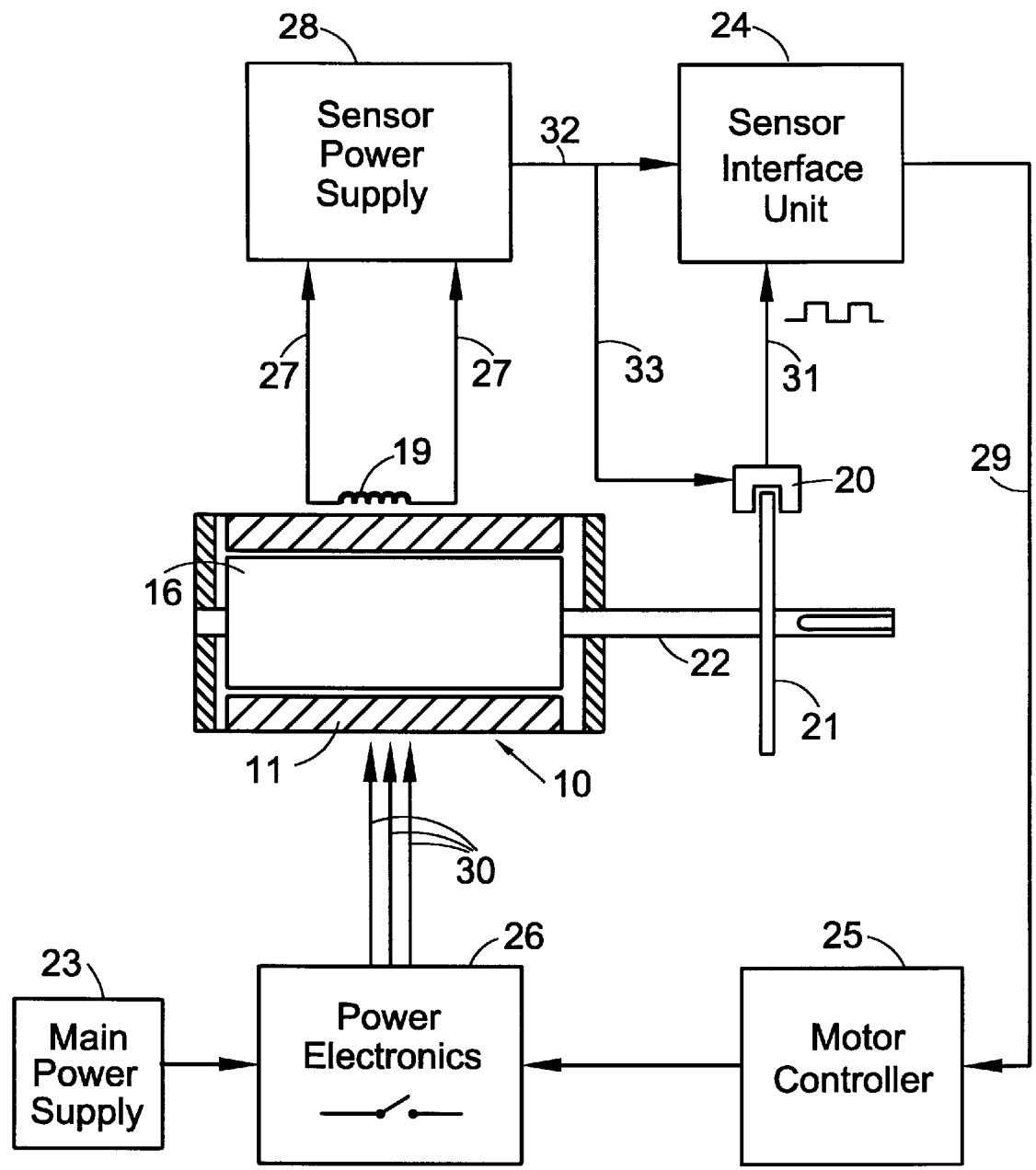
FIG. 2 is a schematic block diagram of a machine system according to an embodiment of the invention.

It is necessary, in this kind of machine, to know the relative position of the poles 18 of the rotor 16 with respect to the stator poles 12 so that the stator poles can be energized at appropriate times and for the appropriate periods. Thus, sensing means are provided in relation to a shaft 22 on which the rotor 16 is mounted. This is illustrated in FIG. 2. The sensing means sense the position of the rotor 16 relative to the stationary stator 11. The sensing means may comprise a suitable sensor 20, a disc 21 mounted to rotate with the shaft 22 and an interface unit 24, or any other suitable kind of arrangement which is sensitive to the position of the rotor. The sensor may be a Hall effect device. Transmissive- or reflective-based opto-electronics could also be used, or capacitive, magnetic or inductive sensing devices are also available. In FIG. 2 the embodiment shown generally illustrates an optical system. The sensor 20 operates in conjunction with the disc 21 carried on the shaft 22. The disc 21 is slotted to induce a digital output from the sensor 20 as the shaft rotates to provide information indicative of the position of the rotor relative to the stator. The output of the sensor 20 is provided via line 31 to the interface unit 24 which, in turn, provides data to a motor controller 25 which switches an available power supply 23 using power switches 26 to power the respective phases of the motor windings 14 at appropriate times to generate the required rotational force. The interface unit can be considered as part of the overall function of the motor system. Its purpose is to provide position information data readable by the controller 25 from the digital output from the sensor 20.

The operation of the sensing means and controller 25 to operate the motor will be familiar to those skilled in the art.

In accordance with embodiments of the invention an electrical power supply for the electrical components of the sensing means 20 is derived locally of the machine 10 from a magnetic field associated with the windings 14, rather than being obtained from an output of the motor controller 25 as is conventional. Thus, there is no need to provide cabling between the motor controller 25 and the sensing means 20 in order to power the sensing means.

In the embodiment illustrated in the drawing, the power supply for the sensing means is derived from the magnetic field generated by the machine windings 14. Thus, a coil (winding) 19 is positioned in that magnetic field within, or at least close enough to, the stator 11 for power to be transferred to the coil 19. It will be appreciated that the coil 19 is illustrated somewhat schematically in FIG. 2 for the purposes of illustration.

Preferably, where the stator comprises a plurality of windings, a coil is provided for each of several windings so as more efficiently to cooperate with the magnetic field of each. The coil 19 may comprise turns around or closely adjacent the, or the respective, winding 14, or may be more elaborate if necessary.

The coil 19 is connected by a suitable, short length of cabling 27 to a power supply unit 28 where the alternating current derived by the coil 19 from the magnetic field is rectified, filtered and regulated as necessary, for a suitable power supply to be derived to power an electrical circuit of the interface unit 24 and the sensor 20 of the sensing means via lines 32, 33, respectively. Thus, power supply 28 includes rectifying, filtering and regulating devices/means as necessary.

The interface unit 24 transmits data to the motor controller 25 via, for example, a fiber optic link 29. Alternatively, the data may be transmitted by other means, preferably not requiring electrically conductive cabling, such as electromagnetically generated radio frequencies. Thus, the power supply for the electronic circuit of the interface unit 24 and the sensor 20 is isolated electrically from the current in the machine 10. Also, the power supply to the sensor 20 and the unit 24 is completely electrically isolated from the motor supply.

In another embodiment, instead of, or in addition to, deriving the power supply for the sensing means 20 from a magnetic field generated by the machine 10, the power supply may be derived from any other magnetic field associated with the machine 10. For example, if desired, a coil may be positioned preferably around, but at least closely adjacent, electrical conductors 30 which carry electrical power gated by the controller 25 to the machine 10. In another arrangement, where the machine 10 is used to drive an apparatus which may generate a magnetic field, the power supply may be derived from that field.

It will be appreciated that until a magnetic field is established, no power supply for the sensing means can be derived. Hence, preferably the power supply unit 28 includes a stand-by battery or other means of storing, or at least initially supplying, electrical power. The battery may be of the rechargeable type, initially to power the sensing means during start-up. Such a battery may also be used in the event of any interruptions in normal operation of the machine 10.

Alternatively, the controller 25 may be arranged to provide a pulse of power to the machine 10 at start-up to cause an initial magnetic field to be developed, sufficient for a voltage to be generated in the auxiliary coil 19.

Embodiments of the invention have been developed particularly but not exclusively for use where the machine controller 25 is located substantially distant from the machine 10, such as in a train application where the motor controller 25 may be located at one end of a carriage and the machine 10 at the other end of the carriage, the machine being of the switched reluctance type which, in use, drives a compressor of an air conditioning/air ventilating system for the carriage. In this application, the saving in cabling to power the sensing means 20 by adoption of embodiments of the present invention can be substantial.

It will be appreciated by the skilled person that embodiments of the invention are also applicable to linear machines as well as the rotary machines referred to above. The moving member of a linear motor, for example, is often referred to as a rotor. The term rotor used herein is intended to embrace such moving members of linear machines.

Embodiments of the invention may be used in any other application where a power supply is required for an electrical circuit and it is desirable to derive this locally as no suitable local power supply is available. Thus, in the example described, the sensing means may comprise an electronic temperature sensor of the kind which requires a power supply, or any other desired electrical circuit.

It will be appreciated that only the sensor 20 and its interface unit 24 are powered from the coil 19 in the above embodiment. However, other functions of the motor system could be powered in the same way. For example, the controller 25 could be powered from the power supply derived from the coil 19 as long as the power requirements of the controller 25 were adequately met by the power output derivable from the coil 19.

Although in the example described, the magnetic field is associated with an electrical machine operated as a motor, in another application, the magnetic field from which the power supply is derived may be associated with another machine such that the power for the control functions of one machine is actually derived from a separate machine. The only requirement would be that the magnetic field is accessible so that a power supply can be derived from it.

While the invention has been described in connection with a machine that is operated to produce a force, torque or electrical power output, such that the power required by, e.g., the sensor is derived from the magnetic field under running conditions, it is also possible to energize the winding or windings partially so that a magnetic field is created prior to running the machine. In this way, a supply is available to power the sensor so that its output is available when the machine is started up thereafter.

The features disclosed in the foregoing description, or the following claims, or the accompanying drawings, expressed in their specific forms or in terms of a means for performing the disclosed function, or a method or process for attaining the disclosed result, as appropriate, may separately or in any combination of such features be utilized for realizing the invention in diverse forms. Accordingly, the invention is to be limited only by the spirit and scope of the accompanying claims.

What is claimed is:

1. An electrical machine system, comprising:
   at least one switched reluctance drive comprising a rotor and a stator, the switched reluctance drive having at least one first winding that produces a magnetic field;
   power switching means for connecting the first winding to a main power supply;
   control means for controlling the switched reluctance drive;
   sensing means for use in determining the relative position of the rotor and stator; and
   second powering means for providing power to the sensing means, the second powering means being electrically isolated from the switched reluctance drive and from the main power supply, the second powering means including at least one second winding for interacting with the magnetic field of the first winding to produce power.

2. The system as claimed in claim 1, wherein the second powering means is electrically connected with the sensing means.

3. The system as claimed in claim 1, wherein the sensing means is operable to produce a digital signal as its output.

4. The system as claimed in claim 1, wherein the control means is arranged to run the switched reluctance drive as a motor.

5. The system as claimed in claim 1, wherein the control means is arranged to run the switched reluctance drive as a generator.

6. The system as claimed in claim 1, further comprising filter means for filtering the power provided by the second powering means to a desired frequency range.

7. The system as claimed in claim 1, further comprising regulating means for regulating the voltage of the power provided by the second powering means to a desired range.

8. A method of powering an electrical circuit using a switched reluctance drive system, the system including at least one switched reluctance drive having at least one first winding that produces a magnetic field, the first winding being connected to a main power supply, the system further including control means for controlling the switched reluctance drive, the method comprising:
   (a) energizing the switched reluctance drive to produce the magnetic field;
   (b) deriving an electrical power supply from the magnetic field using a power supply unit, the power supply unit including at least one second winding for interacting with the magnetic field of the first winding to produce a power output, the power supply unit being electrically isolated from the switched reluctance drive and from the main power supply; and
   (c) providing power to the control means from the power output of the power supply unit.

9. The method as claimed in claim 8, wherein the at least one switched reluctance drive comprises a first member having a plurality of energizable first windings, the energizable first windings creating the magnetic field, and a second member, the second member being movable relative to the first member in response to the magnetic field, further wherein the control means comprises at least one sensor for providing an output indicative of the relative movement between the first and second members, further wherein:
   step (c) includes using the power output of the power supply unit to power the sensor.

10. The method as claimed in claim 9, further comprising the step of producing a digital output with the sensor.

11. The method of claim 9, wherein the first member is a stator and the second member is a rotor, the method further comprising:
   (d) providing an output indicative of the relative rotary movement between the stator and the rotor.

12. The method as claimed in claim 8, further comprising the step of using the control means to operate the switched reluctance drive as a motor.

13. The method as claimed in claim 8, further comprising the step of using the control means to operate the switched reluctance drive as a generator.

14. The method as claimed in claim 8, further comprising the step of filtering the power output of the power supply unit to a desired frequency range.

15. The method as claimed in claim 8, further comprising the step of limiting the voltage of the power output of the power supply unit to a desired range.

16. An electrical machine system, comprising:

at least one switched reluctance drive having at least one first winding that produces a magnetic field;

a power switching unit connecting the first winding to a main power supply to actuate the switched reluctance drive;

an electrical circuit operably coupled with the switched reluctance drive; and a power supply unit for providing power to the electrical circuit, the power supply unit being electrically isolated from the switched reluctance drive and from the main power supply, the power supply unit including at least one second winding for interacting with the magnetic field of the first winding to produce power.

17. The machine system as claimed in claim 16, wherein the switched reluctance drive comprises:

a first member having a plurality of energizable first windings, the energizable first windings creating the magnetic field;

a second member, the second member being movable relative to the first member in response to the magnetic field; and a controller comprising a sensor for providing an output indicative of the relative movement of the first and second members, the power supply unit providing power to the sensor.

18. The machine system as claimed in claim 17, wherein the first member is a stator and the second member is a rotor.

\* \* \* \* \*